J. MITCHELL.
CULTIVATOR-TEETH.

No. 178,180. Patented May 30, 1876.

WITNESSES.
C. N. Woodward
J. R. Drake

Joshua Mitchell,
INVENTOR, By
J. R. Drake
atty.

UNITED STATES PATENT OFFICE.

JOSHUA MITCHELL, OF ELMA, NEW YORK.

IMPROVEMENT IN CULTIVATOR-TEETH.

Specification forming part of Letters Patent No. 178,180, dated May 30, 1876; application filed February 25, 1876.

*To all whom it may concern:*

Be it known that I, JOSHUA MITCHELL, of Elma, in the county of Erie and State of New York, have made certain Improvements in Cultivator-Teeth, of which the following is a specification:

The invention consists in constructing the teeth of cultivators or potato-diggers with wing cutters formed at right angles on the vertical tooth, as hereinafter more fully described.

Figure 1:
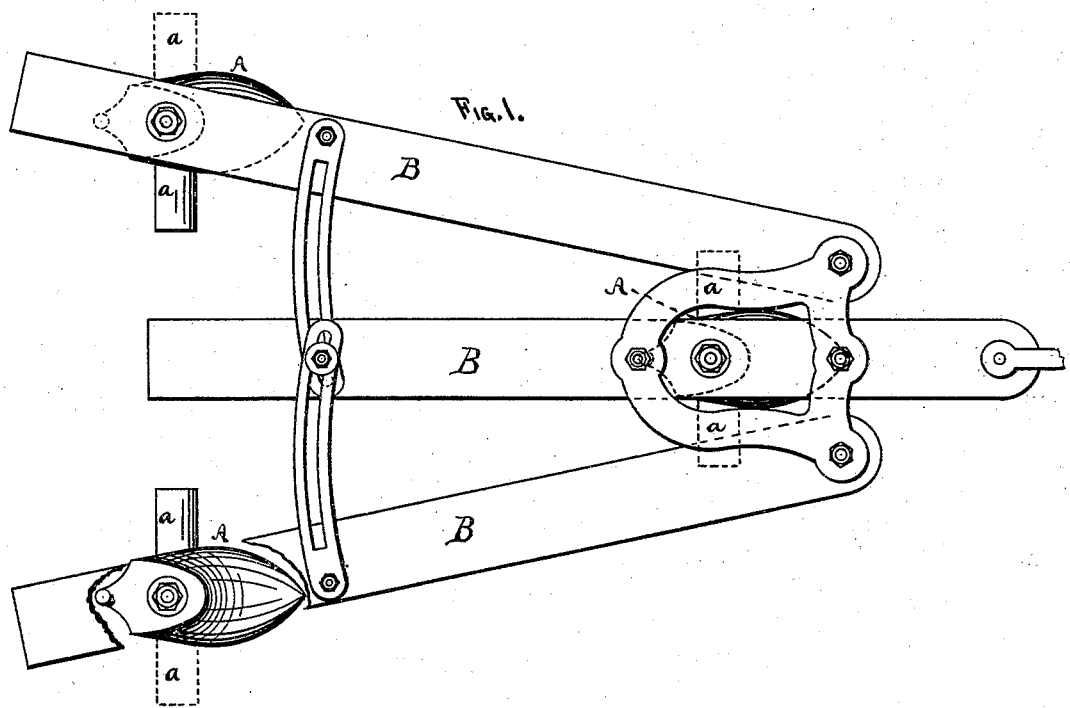
Figure 2:
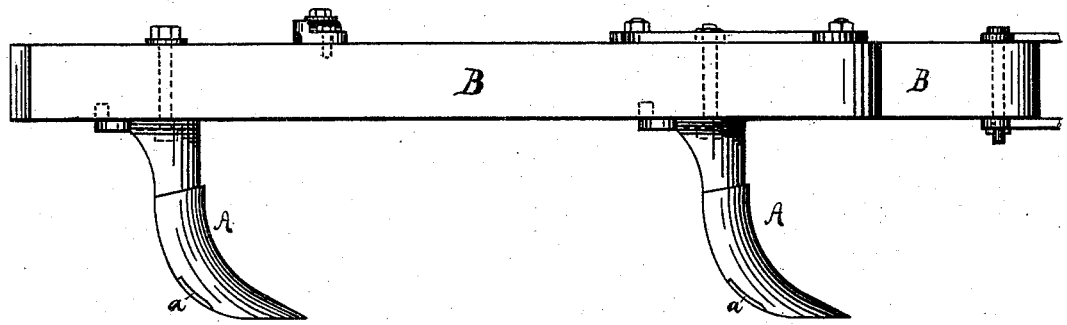

In the drawings, Figure 1 is a plan view of a cultivator; Fig. 2, side elevation of same; and Fig. 3, detail of tooth, showing the two wings.

A A represent the teeth of a cultivator, attached to the frame B, and $a\,a$ are the wing cutters, constructed with and forming part of the tooth A itself.

Figure 3:
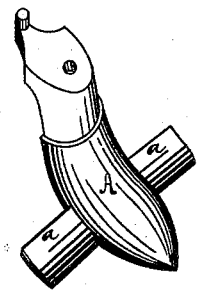

There may be a wing cutter at each side, as shown in Fig. 3, or only one wing to each tooth, as may be desired, for the more efficient working of the machine. If only one wing is constructed on a side of the tooth, as in Fig. 2, the tooth will be removable, so as to place the wings $a\,a$ outside when desired, or inside, as follows: For cultivating, the wing will be on the inside, as in Fig. 1. For digging potatoes, the wings will be outside, and, in going through the rows or hills, these wing cutters will work through one side, and coming back down the next row they will cut the other side. The front tooth C, of course, goes between the hills, the wings of teeth A A alone going into the hills.

As a cultivator, it is unequaled for thoroughness of work, cutting out Canada thistles, weeds, &c., effectually. The front tooth only will have a wing cutter on each or both sides, as in Fig. 3.

I disclaim any auxiliary wing or adjustable cutter for a plow, and only claim—

A cultivator-tooth, with a wing or wings, $a\,a$, formed or cast thereon at right angles thereto, as and for the purpose specified.

In witness whereof I have hereunto signed my name in the presence of two subscribing witnesses.

JOSHUA MITCHELL.

Witnesses:
J. R. DRAKE,
T. H. PARSONS.